(12) United States Patent
Hiraga et al.

(10) Patent No.: US 9,796,026 B2
(45) Date of Patent: Oct. 24, 2017

(54) MACHINING PROGRAM CREATING DEVICE FOR KEYWAY MILLING FOR WIRE ELECTRIC DISCHARGE MACHINE

(71) Applicant: FANUC Corporation, Yamanashi (JP)

(72) Inventors: Kaoru Hiraga, Yamanashi (JP); Masanobu Takemoto, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 283 days.

(21) Appl. No.: 14/744,229

(22) Filed: Jun. 19, 2015

(65) Prior Publication Data
US 2015/0367436 A1 Dec. 24, 2015

(30) Foreign Application Priority Data
Jun. 24, 2014 (JP) ................. 2014-128793

(51) Int. Cl.
| | |
|---|---|
| *B23C 3/30* | (2006.01) |
| *B23H 1/02* | (2006.01) |
| *B23H 7/06* | (2006.01) |
| *B23H 7/20* | (2006.01) |
| *B23H 9/00* | (2006.01) |

(52) U.S. Cl.
CPC ............. *B23C 3/30* (2013.01); *B23H 1/02* (2013.01); *B23H 7/06* (2013.01); *B23H 7/20* (2013.01); *B23H 9/00* (2013.01); *B23H 2500/20* (2013.01); *G05B 2219/37444* (2013.01); *G05B 2219/37452* (2013.01); *G05B 2219/45043* (2013.01); *G05B 2219/45221* (2013.01)

(58) Field of Classification Search
CPC ... B23H 7/02; B23H 7/06; B23H 7/20; B23H 9/00; B23H 2500/20; B23C 3/30; B23C 5/08; B23C 5/14; B23C 5/207; G05B 2219/37444; G05B 2219/37452; G05B 2219/45043; G05B 2219/45221
See application file for complete search history.

(56) References Cited

U.S. PATENT DOCUMENTS

| | | | | |
|---|---|---|---|---|
| 4,338,505 A | * | 7/1982 | Katsube | B23H 7/065 219/69.12 |
| 4,743,729 A | | 5/1988 | Beal | |
| 5,757,649 A | * | 5/1998 | Kato | G05B 19/4097 700/182 |
| 6,011,231 A | * | 1/2000 | Behnke | B23H 7/108 219/68 |
| 6,100,493 A | * | 8/2000 | Takegahara | G05B 19/4099 219/69.12 |

(Continued)

FOREIGN PATENT DOCUMENTS

| | | | | |
|---|---|---|---|---|
| CN | 101856755 A | | 10/2010 | |
| CN | 105290550 A | * | 2/2016 | ............... B23H 7/06 |
| EP | 0685286 A1 | | 12/1995 | |
| JP | 64-20928 A | | 1/1989 | |
| JP | 4-259730 A | | 9/1992 | |

(Continued)

OTHER PUBLICATIONS

Office Action mailed Oct. 13, 2015, corresponding to Japanese Patent Application No. 2014-128793.

(Continued)

*Primary Examiner* — Crystal J Barnes-Bullock
(74) *Attorney, Agent, or Firm* — Hauptman Ham, LLP

(57) ABSTRACT

A machining program creating device for a wire electric discharge machine creates a machining program for machining a keyway on the side surface of a round hole in a workpiece, based on a previously specified diameter of the round hole, a center position of the round hole measured by bringing a wire electrode into contact with the workpiece, and a previously defined shape of the keyway.

6 Claims, 14 Drawing Sheets

(56) References Cited

U.S. PATENT DOCUMENTS

| | | | | |
|---|---|---|---|---|
| 6,739,167 | B2* | 5/2004 | Kobayashi | B21B 13/00 |
| | | | | 72/197 |
| 7,010,953 | B2* | 3/2006 | Stupecky | B21D 39/04 |
| | | | | 29/283.5 |
| 9,073,131 | B2* | 7/2015 | Hughes | B23C 3/30 |
| 9,381,589 | B2* | 7/2016 | Arakawa | B23H 7/06 |
| 9,511,433 | B2* | 12/2016 | Inukai | B23H 7/04 |
| 9,656,339 | B2* | 5/2017 | Takemoto | B23H 7/065 |
| 2016/0107251 | A1* | 4/2016 | Takemoto | B23H 7/20 |
| | | | | 700/162 |
| 2017/0068231 | A1* | 3/2017 | Takemoto | B23H 7/065 |

FOREIGN PATENT DOCUMENTS

| | | | |
|---|---|---|---|
| JP | H08-153132 A | | 6/1996 |
| JP | 2007-307661 A | | 11/2007 |
| JP | 2009-285743 A | | 12/2009 |
| JP | KR 20160000433 A | * 1/2016 | ............ B23H 7/06 |
| KR | 10-0178585 B1 | | 4/1999 |
| RU | 2007103865 A | | 8/2008 |
| RU | 2350439 C2 | | 3/2009 |

OTHER PUBLICATIONS

Extended European Search Report in EP Application No. 15169412. 2, dated Nov. 11, 2015.

Office Action in CN Application No. 201510353705.6, mailed Dec. 28, 2016.

Office Action in KR Application No. 10-2015-0088909, dated Nov. 9, 2016.

* cited by examiner

FIG. 1A

```
O0001
#101=10.0              KEYWAY WIDTH (W)
#102=20.0              KEYWAY DEPTH (T)
#103=50.0/2            ONE-HALF OF HOLE DIAMETER (D) = RADIUS
M60                    CONNECT WIRE ELECTRODE ··· (1)
G70 P0 B3              DETECT END FACE AT POINT 0 ON ROUND HOLE SIDE SURFACE AND REGISTER  ⎫
                       COORDINATE IN P0                                                     ⎪
G75 Y-20.0             MOVE IN ROUND HOLE TO DETECT END FACE AT POINT 1                     ⎪
G75 X5.0               SAME AS ABOVE                                                        ⎬ (2)
G70 P1 B0              DETECT END FACE AT POINT 1 ON ROUND HOLE SIDE SURFACE AND REGISTER   ⎪
                       COORDINATE IN P1                                                     ⎪
G75 X-10.0             MOVE IN ROUND HOLE TO DETECT END FACE AT POINT 2                     ⎪
G75 Y-10.0             SAME AS ABOVE                                                        ⎪
G70 P2 B13             DETECT END FACE AT POINT 2 ON ROUND HOLE SIDE SURFACE AND REGISTER   ⎭
                       COORDINATE IN P2
G79 P10                OBTAIN HOLE CENTER FROM P0, P1, P2 AND REGISTER COORDINATE IN P10
G74 P10                POSITION IN P10 (CENTRAL COORDINATE) ··· (3)
#5201=0.0              SPECIFY ROTATIONAL ANGLE (A) OF PATH
G92 X0 Y0              SET CURRENT POSITION (HOLE CENTER) AS PROGRAM ORIGIN
S1 D1                  DETERMINE MACHINING CONDITION AND OFFSET
G00 G91 X-[#101/2-2.5] Y[#103-5.0]   FAST-FORWARD CLOSE TO CUT PORTION ON LEFT SIDE OF KEYWAY SIDE SURFACE  ⎫
G01 G42 X-2.5 Y2.5     MOVE CLOSE TO CUT PORTION WITH OFFSET                                               ⎪
Y[#102+2.5]            MACHINE LEFT SIDE OF KEYWAY SIDE SURFACE                                            ⎬ (4)
X#101                  MACHINE KEYWAY BOTTOM                                                               ⎪
Y-[#102+2.5]           MACHINE RIGHT SIDE OF KEYWAY SIDE SURFACE                                           ⎭
G40 X-2.5 Y-2.5        MOVE WHILE CANCELING OFFSET
G00 G90 X0 Y0          RETURN TO PROGRAM ORIGIN
M30                    PROGRAM END
```

FIG. 1B

| | |
|---|---|
| O0001 | |
| #101=10.0 | KEYWAY WIDTH (W) |
| #102=20.0 | KEYWAY DEPTH (T) |
| M60 | CONNECT WIRE ELECTRODE ··· (1) |
| G70 P0 B3 | DETECT END FACE AT POINT 0 ON ROUND HOLE SIDE SURFACE AND REGISTER COORDINATE IN P0 |
| G75 Y-20.0 | MOVE IN ROUND HOLE TO DETECT END FACE AT POINT 1 |
| G75 X5.0 | SAME AS ABOVE |
| G70 P1 B0 | DETECT END FACE AT POINT 1 ON ROUND HOLE SIDE SURFACE AND REGISTER COORDINATE IN P1 |
| G75 X-10.0 | MOVE IN ROUND HOLE TO DETECT END FACE AT POINT 2 |
| G75 Y-10.0 | SAME AS ABOVE |
| G70 P2 B13 | DETECT END FACE AT POINT 2 ON ROUND HOLE SIDE SURFACE AND REGISTER COORDINATE IN P2 |
| G79 P10 | OBTAIN HOLE CENTER FROM P0, P1, P2 AND REGISTER COORDINATE IN P10 |
| G74 P10 | POSITION IN P10 (CENTRAL COORDINATE) ··· (3) |
| #103=#5301/2 | ONE-HALF OF HOLE DIAMETER (D) MEASURED BY POSITION MEASUREMENT FUNCTION |
| #5201=0.0 | SPECIFY ROTATIONAL ANGLE (A) OF PATH |
| G92 X0 Y0 | SET CURRENT POSITION (HOLE CENTER) AS PROGRAM ORIGIN |
| S1 D1 | DETERMINE MACHINING CONDITION AND OFFSET |
| G00 G91 X-[#101/2-2.5] Y[#103-5.0] | FAST-FORWARD CLOSE TO CUT PORTION ON LEFT SIDE OF KEYWAY SIDE SURFACE |
| G01 G42 X-2.5 Y2.5 | MOVE CLOSE TO CUT PORTION WITH OFFSET |
| Y[#102+2.5] | MACHINE LEFT SIDE OF KEYWAY SIDE SURFACE |
| X#101 | MACHINE KEYWAY BOTTOM |
| Y-[#102+2.5] | MACHINE RIGHT SIDE OF KEYWAY SIDE SURFACE |
| G40 X-2.5 Y-2.5 | MOVE WHILE CANCELING OFFSET |
| G00 G90 X0 Y0 | RETURN TO PROGRAM ORIGIN |
| M30 | PROGRAM END |

(2) groups the first block of detection lines; (4) groups the machining block.

FIG. 5A
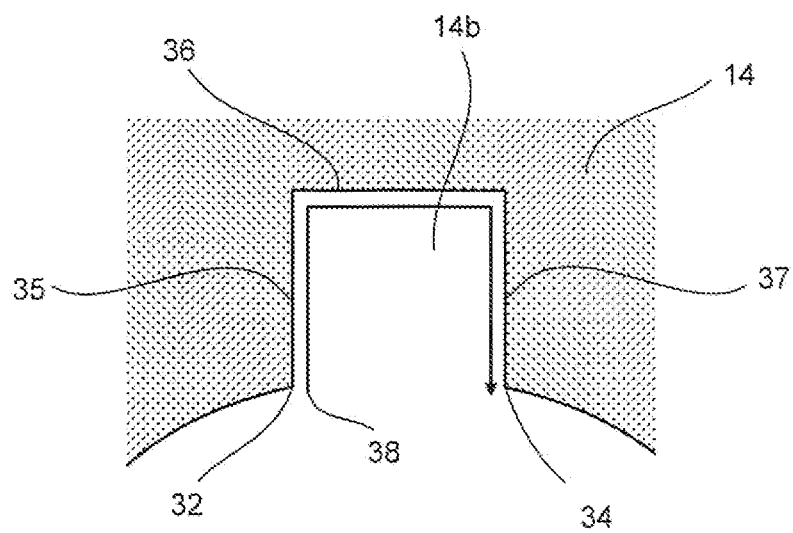
FIG. 5B
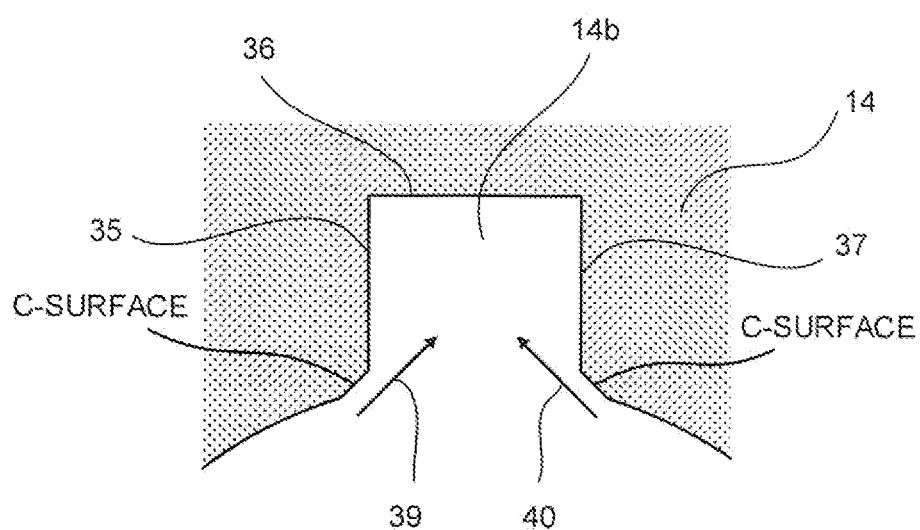

FIG. 6A
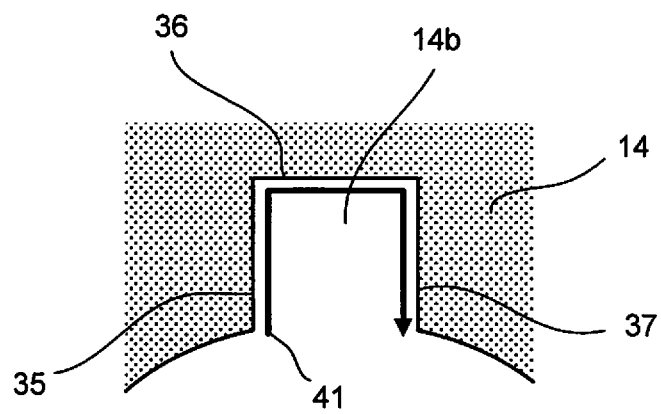
FIG. 6B
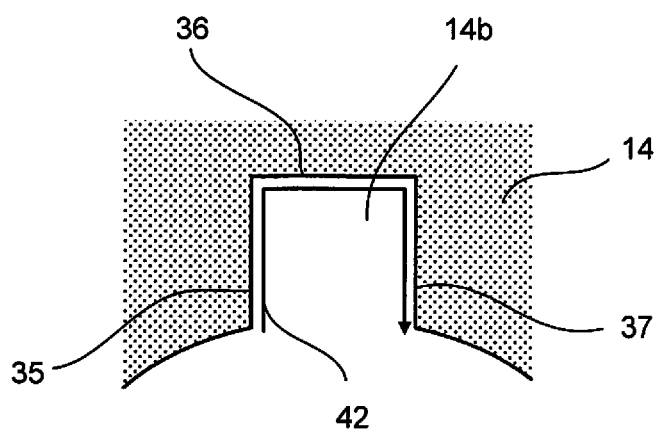

FIG. 10

| | |
|---|---|
| #5201=0.0 | SPECIFY ROTATIONAL ANGLE (A) OF PATH |
| G92 X0 Y0 | SET CURRENT POSITION AS PROGRAM ORIGIN |
| S1 D1 | DETERMINE MACHINING CONDITION AND OFFSET |
| G00 G91 Y[#103-5.0] | FAST-FORWARD CLOSE TO KEYWAY CUT PORTION IN KEYWAY CENTER |
| G01 G41 Y[#102+5.0] | MACHINE TO KEYWAY BOTTOM |
| X-[#101/2] | MACHINE LEFT HALF OF KEYWAY BOTTOM |
| Y-[#102+5.0] | MACHINE LEFT SIDE OF KEYWAY SIDE SURFACE |
| G40 X[#101/2] | RETURN TO KEYWAY CENTER |
| G01 G42 Y[#102+5.0] | MACHINE TO KEYWAY BOTTOM |
| X[#101/2] | MACHINE RIGHT HALF OF KEYWAY BOTTOM |
| Y-[#102+5.0] | MACHINE RIGHT SIDE OF KEYWAY SIDE SURFACE |
| G40 -X[#101/2] | RETURN TO KEYWAY CENTER |
| G00 G90 X0 Y0 | RETURN TO PROGRAM ORIGIN |
| M30 | PROGRAM END |

FIG. 11

| | |
|---|---|
| #5201=0.0 | SPECIFY ROTATIONAL ANGLE (A) OF PATH |
| G92 X0 Y0 | SET CURRENT POSITION AS PROGRAM ORIGIN |
| S1 D1 | DETERMINE MACHINING CONDITION AND OFFSET |
| G00 G91 X-[#101/2-2.5] Y[#103-5.0] | FAST-FORWARD CLOSE TO CUT PORTION ON LEFT SIDE OF KEYWAY SIDE SURFACE |
| G01 G42 X-2.5 Y2.5 | MOVE CLOSE TO CUT PORTION WITH OFFSET |
| Y[#102+2.5] | MACHINE LEFT SIDE OF KEYWAY SIDE SURFACE |
| X#101 | MACHINE KEYWAY BOTTOM |
| Y-[#102+2.5] | MACHINE RIGHT SIDE OF KEYWAY SIDE SURFACE |
| G40 X-2.5 Y-2.5 | MOVE WHILE CANCELING OFFSET |
| G00 G90 X0 Y0 | RETURN TO PROGRAM ORIGIN |
| M30 | PROGRAM END |

FIG. 12

| | |
|---|---|
| #106=1.0 | C-SURFACE |
| #5201=0.0 | SPECIFY ROTATIONAL ANGLE (A) OF PATH |
| G92 X0 Y0 | SET CURRENT POSITION AS PROGRAM ORIGIN |
| S1 D1 | DETERMINE MACHINING CONDITION AND OFFSET |
| G00 G91 X-[#101/2-2.5] Y[#103-5.0] | FAST-FORWARD CLOSE TO CUT PORTION ON LEFT SIDE OF KEYWAY SIDE SURFACE |
| G01 G42 X-2.5 Y2.5 | MOVE CLOSE TO CUT PORTION WITH OFFSET |
| Y[#102+2.5] | MACHINE LEFT SIDE OF KEYWAY SIDE SURFACE |
| X#101 | MACHINE KEYWAY BOTTOM |
| Y-[#102+2.5] | MACHINE RIGHT SIDE OF KEYWAY SIDE SURFACE |
| G40 X-2.5 Y-2.5 | MOVE WHILE CANCELING OFFSET |
| G00 G90 X0 Y0 | RETURN TO PROGRAM ORIGIN |
| G00 G91 X-[#101/2-2.5] Y[#103-2.5] | FAST-FORWARD CLOSE TO CUT PORTION ON LEFT SIDE OF KEYWAY SIDE SURFACE |
| G01 G42 X[-2.5-#106-1.0] Y[2.5-1.0] | MOVE TO C-SURFACE MACHINING START POSITION |
| X[#106+1.0+1.0] Y[#106+1.0+1.0] | MACHINE C-SURFACE ON LEFT SIDE OF KEYWAY SIDE SURFACE |
| G40 Y-1.0 | MOVE WHILE CANCELING OFFSET |
| G00 G90 X0 Y0 | RETURN TO PROGRAM ORIGIN |
| G00 G91 X[#101/2+2.5] Y[#103-2.5] | FAST-FORWARD CLOSE TO CUT PORTION ON RIGHT SIDE OF KEYWAY SIDE SURFACE |
| G01 G41 X[2.5+#106+1.0] Y[2.5-1.0] | MOVE TO C-SURFACE MACHINING START POSITION |
| X-[#106+1.0+1.0] Y[#106+1.0+1.0] | MACHINE C-SURFACE ON RIGHT SIDE OF KEYWAY SIDE SURFACE |
| G40 Y-1.0 | MOVE WHILE CANCELING OFFSET |
| G00 G90 X0 Y0 | RETURN TO PROGRAM ORIGIN |
| M30 | PROGRAM END |

FIG. 13

| | |
|---|---|
| #5201=0.0 | SPECIFY ROTATIONAL ANGLE (A) OF PATH |
| G92 X0 Y0 | SET CURRENT POSITION AS PROGRAM ORIGIN |
| S1 D1 | DETERMINE MACHINING CONDITION AND OFFSET |
| G00 G91 X-[#101/2-2.5] Y[#103-5.0] | FAST-FORWARD CLOSE TO CUT PORTION ON LEFT SIDE OF KEYWAY SIDE SURFACE |
| G01 G42 X-2.5 Y2.5 | MOVE CLOSE TO CUT PORTION WITH OFFSET |
| Y[#102+2.5] | MACHINE LEFT SIDE OF KEYWAY SIDE SURFACE |
| X#101 | MACHINE KEYWAY BOTTOM |
| Y-[#102+2.5] | MACHINE RIGHT SIDE OF KEYWAY SIDE SURFACE |
| G40 X-2.5 Y-2.5 | MOVE WHILE CANCELING OFFSET |
| G00 G90 X0 Y0 | RETURN TO PROGRAM ORIGIN |
| S2 D2 | SWITCH MACHINING CONDITION AND OFFSET |
| G00 G91 X-[#101/2-2.5] Y[#103-5.0] | FAST-FORWARD CLOSE TO CUT PORTION ON LEFT SIDE OF KEYWAY SIDE SURFACE |
| G01 G42 X-2.5 Y2.5 | MOVE CLOSE TO CUT PORTION WITH OFFSET |
| Y[#102+2.5] | MACHINE LEFT SIDE OF KEYWAY SIDE SURFACE |
| X#101 | MACHINE KEYWAY BOTTOM |
| Y-[#102+2.5] | MACHINE RIGHT SIDE OF KEYWAY SIDE SURFACE |
| G40 X-2.5 Y-2.5 | MOVE WHILE CANCELING OFFSET |
| G00 G90 X0 Y0 | RETURN TO PROGRAM ORIGIN |
| M30 | PROGRAM END |

MACHINING PROGRAM CREATING DEVICE FOR KEYWAY MILLING FOR WIRE ELECTRIC DISCHARGE MACHINE

RELATED APPLICATIONS

The present application claims priority to Japanese Application Number 2014-128793, filed Jun. 24, 2014, the disclosure of which is hereby incorporated by reference herein in its entirety.

BACKGROUND OF THE INVENTION

Field of the Invention

The present invention relates to a machining program creating device for keyway milling for a wire electric discharge machine.

Description of the Related Art

Conventionally, a special machine such as a slotter (or slotting machine) has been used to machine a keyway on the side surface of a round hole in a workpiece. The slotter is a cutting machine in which a ram with a cutting tool vertically reciprocates to machine the inner surface of the hole. Since the slotter is a kind of special-purpose machine using the single cutting tool, it has a problem that its machining efficiency is low. Since the cutting tool used must be provided for each of different keyway sizes, moreover, the productivity of the slotter is also low or insufficient.

In recent years, some attempts have been made to use general-purpose machines for machining such as keyway milling, in order to improve productivity. To this end, there is a promising method in which a keyway is machined on the side surface of a round hole in a workpiece by using a wire electric discharge machine as a general-purpose machine.

Japanese Patent Application Laid-Open No. 8-153132 discloses a CAD/CAM device provided with keyway defining means configured to input the shapes of a keyway and a key for securing a component to a component mounting hole. A figure can be automatically drawn by only selecting the component mounting hole defined by the keyway defining means and inputting parameters. In this way, the CAD/CAM device can generate NC data for keyway milling.

However, many operators accustomed to use special-purpose machines may be unfamiliar with the operation of a general-purpose machine or poor at creating a machining program for running the general-purpose machine. Thus, there is a problem that the productivity cannot be improved as expected. In machining a keyway on the side surface of a round hole in a workpiece by means of a wire electric discharge machine, for example, the following steps of operation are conventionally required:
 (a) the workpiece with the round hole is set on the machine,
 (b) upper and lower nozzles supporting a wire electrode are moved to an arbitrary position in the round hole,
 (c) the wire electrode is connected,
 (d) the diameter and center position of the round hole are obtained by means of a positioning function of the wire electric discharge machine,
 (e) the upper and lower nozzles are moved to a machining start point in the round hole,
 (f) a machining program starting at the machining start point is created in consideration of the diameter and center position of the round hole and the size of the keyway, and
 (g) a start button for electric discharge machining is depressed.

It is very time-consuming for operators unfamiliar with the wire electric discharge machine to perform the above steps of operation as initial setup and the productivity cannot be increased. Further, performing the keyway milling by using the wire electric discharge machine as a general-purpose machine also involves the following problems.

The problem of cutting a workpiece during wire electric discharge machining will be described with reference to FIGS. 15 and 16.

FIG. 15 shows how a wire electrode 2 receives a force opposite to a wire advancing direction 6 in a case where a machined surface 4a and a machining path 8 extend perpendicular to each other as a workpiece 4 is cut.

FIG. 16 shows how the wire electrode 2 is deviated from the machining path 8 in a case where the machined surface 4a and the machining path 8 do not extend perpendicular to each other as the workpiece 4 is cut. Reference numeral 10 in FIG. 15 and FIG. 16 schematically denotes electric discharges between the wire electrode 2 and the machined surface 4a.

If the machined surface 4a and the machining path 8 are perpendicular to each other when the wire electrode 2 cuts into the workpiece 4 during the wire electric discharge machining, as shown in FIG. 15, the sum total (denoted by numeral 12) of a force of discharge repulsion produced in the wire electrode 2 and a force the wire electrode 2 receives from a working fluid acts in the direction opposite to the advancing direction of the wire electrode 2 along the machining path 8.

In contrast, if the machined surface 4a and the machining path 8 are not perpendicular to each other, as shown in FIG. 16, the sum total 12 of the force of discharge repulsion and the force received from the working fluid acts off the machining path 8, depending on the angle between the machined surface 4a and the machining path 8. Consequently, there arises a problem that the wire electrode 2 is deviated from the machining path 8 by the resultant force. This problem may sometimes cause a problem that the shape accuracy of an opening of a keyway to be machined is degraded and the opening becomes so narrow that a key 22 cannot be inserted into a keyway 14b (see FIG. 19). This problem may be caused in, for example, thick plate machining performed with increased discharge energy and amount of working fluid, though it seldom occurs in thin plate machining.

A conventional method for machining a keyway on the side surface of a round hole in a workpiece will now be described with reference to FIGS. 17 to 19.

In a case where the keyway 14b is machined in a round hole 15 in a workpiece 14 such as that shown in FIG. 17, a machining path 18 (represented by a dotted line) for the shortest machining distance is formed. In machining the keyway 14b on a machined surface 14a of the round hole 15 along the machining path 18, the above-described force acts on the wire electrode 2 so that the wire electrode 2 is deviated from the machining path (as indicated by an actual movement path 20 of the wire electrode 2 of FIG. 18), since the machined surface 14a and the machining path 18 do not extend perpendicular to each other. Consequently, a cut portion of the keyway 14b is shaped like a part 24 of FIG. 19, so that the width of a keyway opening inevitably becomes smaller than a width specified in a drawing or the like. Thus, there arises a problem that the key 22 shown in FIG. 19 cannot be inserted into the machined keyway 14b.

According to the aforementioned technique disclosed in Japanese Patent Application Laid-Open No. 8-153132, the keyway defining means and keyway database registration means are provided so that the NC data for keyway milling can be generated. Since the NC data is generated without considering problems that may arise when an arc-shaped machined surface is subjected to wire electric discharge machining, however, there may arise a problem that the key cannot be inserted into the keyway. Further, no improvement in operability is achieved for operators who are accustomed to use special-purpose machines.

In order to solve the above problems on the productivity of the conventional technique, the keyway milling is expected to be achieved using the wire electric discharge machine by performing only three (steps of (a) setting the workpiece with the round hole on the machine, (b) moving the upper and lower nozzles supporting the wire electrode to an arbitrary position in the round hole, and (g) depressing the start button for electric discharge machining) of the above-described steps of operation.

SUMMARY OF THE INVENTION

Accordingly, in order to solve the above-described problems, the present invention has an object to provide a machining program creating device for a wire electric discharge machine, configured to create a machining program for machining a keyway on a side surface of a round hole in a workpiece, whereby the productivity of keyway milling by the wire electric discharge machine can be improved.

Another object of the present invention is to provide a machining program creating device for a wire electric discharge machine, capable of forming a machining path for keyway milling free of a problem specific to the wire electric discharge machine such that an opening of a keyway becomes narrow as the machining path is formed.

A first aspect of a machining program creating device for a wire electric discharge machine according to the present invention creates a machining program for machining a keyway on a side surface of a round hole in a workpiece. The machining program creating device comprises a keyway defining section configured to define a shape of the keyway to be machined, a hole diameter specification section configured to specify a diameter of the round hole, and a machining program creating section configured to measure a center position of the round hole by bringing a wire electrode into contact with the workpiece and create the machining program for machining the keyway, based on the measured center position of the round hole, the shape of the keyway defined by the keyway defining section, and the diameter of the round hole specified by the hole diameter specification section.

A second aspect of the machining program creating device for a wire electric discharge machine according to the present invention creates a machining program for machining a keyway on a side surface of a round hole in a workpiece. The machining program creating device comprises a keyway defining section configured to define a shape of the keyway to be machined and a machining program creating section configured to measure a center position and a diameter of the round hole by bringing a wire electrode into contact with the workpiece and create the machining program for machining the keyway, based on the measured center position and diameter of the round hole and the shape of the keyway defined by the keyway defining section.

The machining program creating section may be configured to create the machining program for such a machining path that an opening of the keyway is kept from becoming narrow.

Further, the machining program creating section may be configured to create the machining program so that the wire electrode advances from a bottom portion of the keyway toward the opening along the machining path for machining side surfaces of the keyway, on either side of the keyway.

The machining program creating section may be configured to create the machining program so that a chamfer or a corner R portion is formed at the opening of the keyway.

The machining program creating section may be configured to create the machining program so that the wire electrode advances from a bottom portion of the keyway toward the opening along the machining path for machining side surfaces of the keyway and so as to repeatedly form the same path as that once machined or a path shifted in an offset direction of the wire electrode.

According to the present invention, there can be provided a machining program creating device for a wire electric discharge machine, configured to create a machining program for machining a keyway on a side surface of a round hole in a workpiece, whereby the productivity of keyway milling by the wire electric discharge machine can be improved.

According to the present invention, moreover, there can be provided a machining program creating device for a wire electric discharge machine, capable of forming a machining path for keyway milling free of a problem specific to the wire electric discharge machine such that an opening of a keyway becomes narrow as the machining path is formed.

BRIEF DESCRIPTION OF THE DRAWINGS

The above and other objects and features of the present invention will be obvious from the ensuing description of embodiments with reference to the accompanying drawings, in which:

FIG. 1A shows a first example of a machining program created by a machining program creating device for keyway milling for a wire electric discharge machine according to the present invention;

FIG. 1B shows a second example of the machining program created by the machining program creating device for keyway milling for a wire electric discharge machine according to the present invention;

FIGS. 5A and 5B are diagrams showing a second example of the keyway milling method used to avoid the problems on the keyway milling;

FIGS. 6A and 6B are diagrams showing a third example of the keyway milling method used to avoid the problems on the keyway milling;

FIG. 10 shows a program example for a case where only item (1) is checked on the dialog screen of FIG. 9;

FIG. 11 shows a program example for a case where none of items (1) to (3) is checked on the dialog screen of FIG. 9;

FIG. 12 shows a program example for a case where only item (2) is checked on the dialog screen of FIG. 9;

FIG. 13 shows a program example for a case where only item (3) is checked on the dialog screen of FIG. 9;

DETAILED DESCRIPTION OF THE PREFERRED EMBODIMENTS

Figure 2:
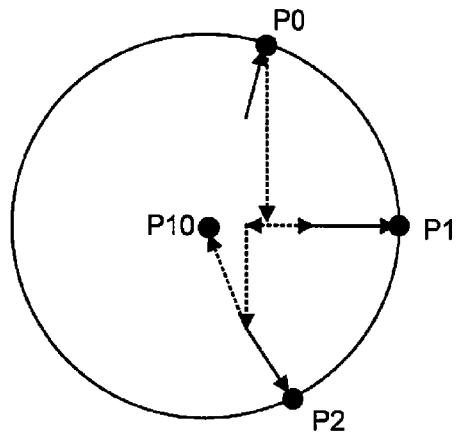
FIG. 2 is a diagram showing an operation (2) in machining program examples shown in FIGS. 1A and 1B.

A method for solving the problem of productivity in manufacturing a keyway will be described first. In order to improve the productivity in keyway milling, a machining program for the following operations related to the initial setup of the keyway milling is created by using a machining program creating device for keyway milling for a wire electric discharge machine according to the present invention.

(1) A wire electrode is connected.

(2) The diameter and center position of a round hole in a workpiece are obtained by means of a position measurement function of the wire electric discharge machine. If the wire electric discharge machine does not have the function of measuring the diameter of the round hole in the workpiece, this function may be set in the machining program creating device by an operator (see FIGS. 1A and 8).

(3) Upper and lower nozzles are moved to a machining start point (hole center) in the round hole.

(4) The machining program starting at the machining start point is created in consideration of the diameter and center position of the round hole in the workpiece and the size of the keyway.

FIG. 1A shows a first example of the machining program created by the machining program creating device for keyway milling for a wire electric discharge machine according to the present invention.

In a machining program (O0001) shown in FIG. 1A, (1) represents an operation command for the connection of the wire electrode; (2) represents operation commands for the measurement of the hole center position; (3) represents an operation command for positioning in the center position (P10) obtained by performing the operation (2); and (4) represents commands for defined keyway milling.

Number #101 designates a parameter indicative of a keyway width (W); #102 designates a parameter indicative of a keyway depth (T); and #103 designates a parameter indicative of a radius that is one-half of the hole diameter (D). Number #5201 designates a parameter that specifies a rotational angle (A) of a path and a position in the round hole where the keyway is machined. These parameters are set in the machining program creating device by the operator. The hole radius #103 may be measured by means of the position measurement function of the wire electric discharge machine, and the result of the measurement to be written in a system parameter may be assigned for substitution. Thus, if the hole diameter (D) measured by the position measurement function is written in the parameter #5301, the machining program should only be set so that "#103=#5301/2" is given (see second example of the machining program shown in FIG. 1B).

M60 designates an auxiliary command for the connection of the wire electrode, which is a normal function of the wire electric discharge machine.

Blocks ranging from block "G70 P0 B3" to block "G79 P10" represent operation commands for the measurement of the hole center position to be executed using position measurement function of the wire electric discharge machine.

"G74 P10" represents a command for positioning of the wire electrode in P10 (hole center position).

Blocks ranging from block "#5201=0.0" to block "G00 G90 X0 Y0" represent commands for keyway milling. Keyway milling methods include machining methods 1 to 3, which will be described later.

Further, FIG. 2 is a diagram showing the operation (2) in the first and second examples of the machining program shown in FIGS. 1A and 1B.

Using the position measurement function of the wire electric discharge machine, the wire electrode is brought into contact with the side surface of the round hole in the workpiece, whereby the position of the side surface of the round hole is measured. Information on the center position of the round hole can be obtained by measuring a plurality of spots (at least three) on the side surface of the hole. Furthermore, information on the diameter of the round hole can be acquired from the obtained center position of the round hole and the measurement position on the side surface of the hole.

Figure 3:
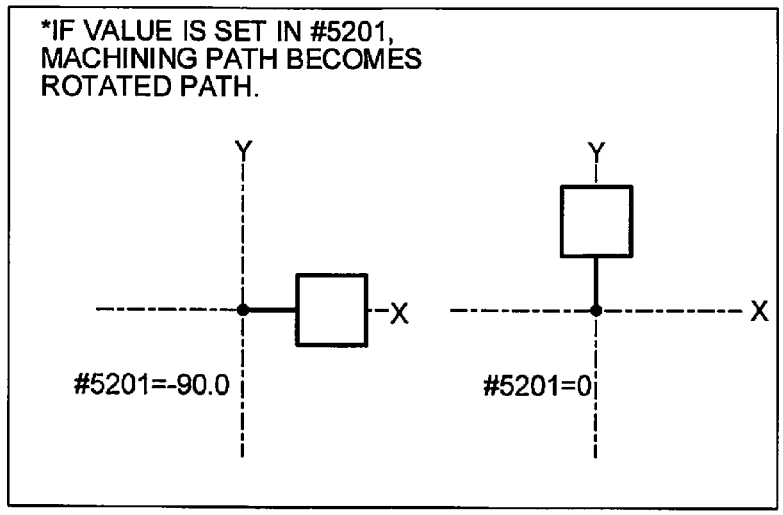
FIG. 3 is a diagram showing a machining path for a case where a value is set in a parameter #5201 in the machining program examples shown in FIGS. 1A and 1B.

FIG. 3 is a diagram showing a machining path for a case where a value is set in the parameter #5201 in the first and second examples of the machining program shown in FIGS. 1A and 1B. If the value is set in the parameter #5201, the machining path becomes a rotated path.

The following is a description of a method for avoiding problems on the keyway milling. According to this method, a machining program for keyway milling based on the following machining methods is created. The present invention is characterized in that the avoiding method based on the following machining methods can be easily used by the operator.

<Machining Method 1>

Figure 4:
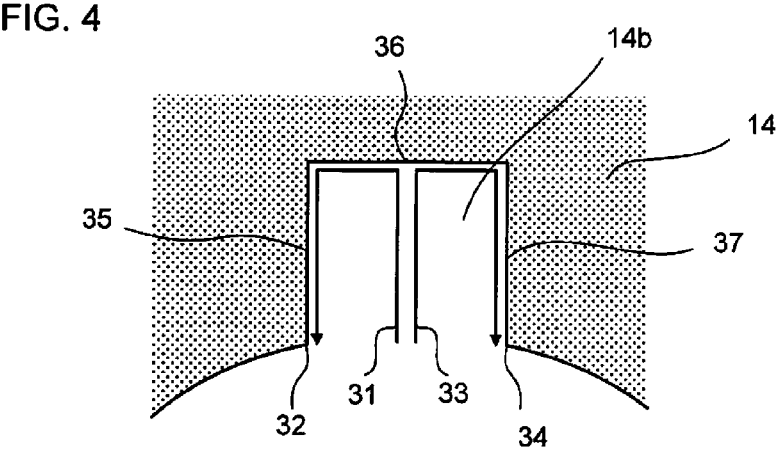
FIG. 4 is a diagram showing a first example of a keyway milling method used to avoid problems on the keyway milling.

The machining method 1 will be described with reference to FIG. 4. A keyway 14b is cut along a first machining path 31 to the center and machined to its bottom portion (keyway bottom surface 36). When the machining reaches the bottom surface 36 of the keyway 14b, the keyway bottom surface 36 is machined to the left as in FIG. 4. When the leftward machining reaches a keyway side surface 35, the machining is directed toward an opening (keyway inlet 32). Then, the keyway 14b is cut along a second machining path 33 to the center and machined to its bottom portion (keyway bottom surface 36). When the machining reaches the keyway bottom surface 36, the bottom surface 36 is machined to the right as in FIG. 4. When the rightward machining reaches a keyway side surface 37, the machining is directed toward an opening (keyway inlet 34).

According to this machining method 1, a wire electrode 2 is located in a workpiece 14 while the keyway opening is being machined. Therefore, the lateral distance between the wire electrode 2 and the workpiece 14 is invariable, so that a biased water flow cannot be produced. Consequently, the wire electrode 2 can machine the path according to a command and keep the opening of the keyway 14b from becoming narrow. Even if the machining path for the wire electrode 2 is biased at a cut portion, moreover, the finished workpiece cannot be affected thereby, since the cut portion is a useless or waste product.

<Machining Method 2>

The machining method 2 will be described with reference to FIGS. 5A and 5B. According to this machining method 2, machining is performed along a normal path (machining path 38) for the shortest machining distance, as shown in FIG. 5A. Thereafter, as shown in FIG. 5B, a chamfer or corner R is machined along machining paths 39 and 40 at the keyway opening. Consequently, the narrowed keyway opening is cut off by the chamfer or corner machining.

<Machining Method 3>

The machining method 3 will be described with reference to FIGS. 6A and 6B. According to this machining method 3, machining (roughing 41) is performed along a normal path for the shortest distance, as shown in FIG. 6A. Thereafter, as shown in FIG. 6B, machining (finishing 42) is performed along the same path again or along a machining path shifted in the offset direction under different machining conditions. Normally, in second and subsequent machining cycles (finishing 42), the jet amount of a working fluid per unit time is smaller than in a first machining cycle (roughing 41). This is because the finishing is performed so as to trace a machined groove formed by the roughing, so that the amount of machining of the workpiece 14 is small, and therefore, the jet amount of the working fluid need not be large. Thus, in finishing the keyway opening, the deviation of the wire electrode 2 from the commanded path toward the center of a circle can be suppressed, and a narrowed part of the keyway opening can be machined. Consequently, the size of the narrowed keyway opening is corrected.

In order to accurately machine the keyway in the round hole in the workpiece, a machining path must be created such that machining is performed by one or more of the above methods, which requires the operator (who creates the machining path or the machining program) to be experienced.

Figure 7:
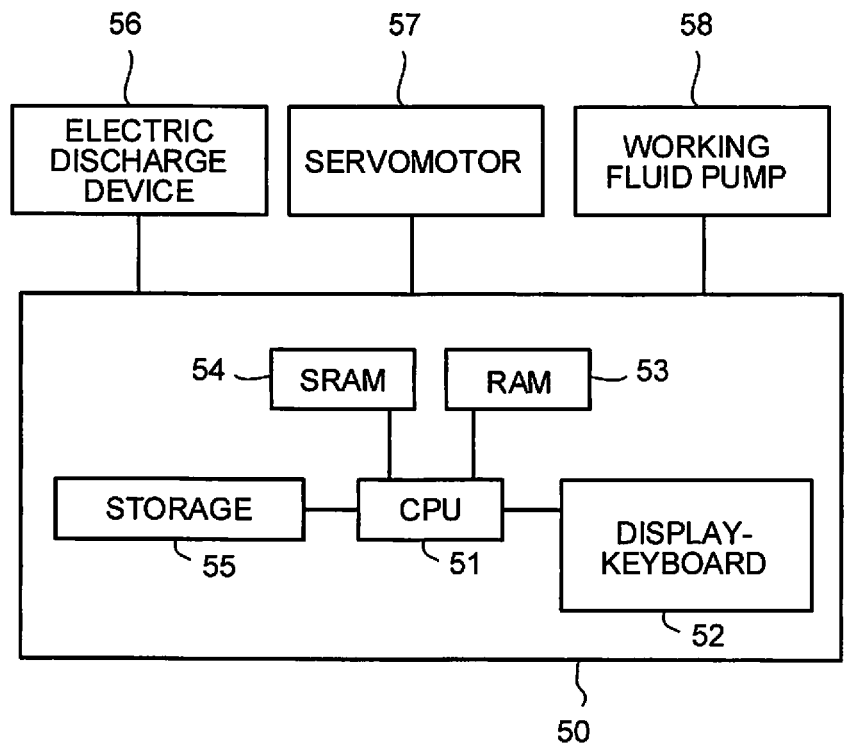
FIG. 7 is a block diagram of the wire electric discharge machine that performs the first to third examples of the keyway milling method shown in FIGS. 4 to 6B.

FIG. 7 is a block diagram showing the wire electric discharge machine that performs the machining methods 1 to 3.

The wire electric discharge machine comprises an electric discharge device 56, servomotors 57, working fluid pump 58, and numerical controller 50. The electric discharge device 56 applies a voltage across the wire electrode 2 and the workpiece 14 and supplies a current thereto. The servomotors 57 drive respective axes of the wire electric discharge machine. The working fluid pump 58 serves to circulate the working fluid in a machining tank, sewage tank, and clean water tank. The numerical controller 50 controls the entire wire electric discharge machine. The numerical controller 50 comprises a CPU 51, display-keyboard 52, RAM 53, SRAM 54, and storage 55. The display-keyboard 52 comprises a display and a keyboard.

The shape of the keyway and the diameter and position of the round hole input from the display-keyboard 52 are stored in the storage 55 or the SRAM 54. Machining program creating means (software for creating the machining program) is registered in the storage 55. After the numerical controller 50 is turned on, the software is copied to the RAM 53 and performed using the CPU 51. The created machining program is loaded into the storage 55 or the SRAM 54.

The machining program creating device is incorporated in the numerical controller 50, which is mounted in the wire electric discharge machine. The numerical controller 50 of the wire electric discharge machine, which serves as this machining program creating device, obtains the center position of the round hole and creates the machining program for machining the keyway, based on data input through the display-keyboard.

The numerical controller 50 of FIG. 7 for use as the machining program creating device is provided with means for specifying the shape of the keyway to be machined. The machining program creating device defines a machining program to be created as the machining program for keyway milling. Further, the machining program creating device is provided with means for specifying the diameter of the round hole. Thus, the machining program creating device determines the machining shape of the keyway and the diameter of the round hole.

Furthermore, the machining program creating device measures the center position of the round hole using the position measurement function, and creates the machining program for keyway milling based on the measured center position and the previously specified keyway shape and round hole diameter. Since the machining program to be created is previously defined as being intended for keyway milling, the machining program creating device can perform processing dedicated for keyway milling and creates such a machining program that the opening of the keyway can be kept from becoming narrow.

The machining program creating device creates the machining program so that the wire electrode 2 advances from the bottom portion of the keyway toward the opening on either side thereof as it machines the side surfaces of the keyway during the dedicated processing for keyway milling. In this way, the keyway opening can be kept from becoming narrow (see machining method 1 shown in FIG. 4).

Further, the machining program creating device can keep the keyway opening from becoming narrow by forming the chamfer or corner R portion at the keyway opening during the dedicated processing for keyway milling (see machining method 2 shown in FIGS. 5A and 5B).

Furthermore, the machining program creating device can keep the keyway opening from becoming narrow by repeatedly forming the same path as that once machined or the path shifted in the offset direction of the wire electrode 2 (see machining method 3 shown in FIGS. 6A and 6B).

The numerical controller 50 of the wire electric discharge machine can be used as the machining program creating device by storing in storage means the machining program creating means (software for creating the machining program). Alternatively, by incorporating machining program creating means (software for creating the machining program) into an external device, such as a personal computer, the external device may be used as a machining program creating device for the wire electric discharge machine.

When the numerical controller 50 mounted in the wire electric discharge machine executes the created machining program, the CPU 51 analyzes the machining program and issues commands to the electric discharge device 56, servomotors 57, and working fluid pump 58. The electric discharge device 56, servomotors 57, and working fluid pump 58 operate in response to the commands, and the working fluid is delivered as the wire electric discharge machine moves the wire electrode 2 for electric discharge relative to the workpiece, thereby machining the workpiece.

Figure 8:
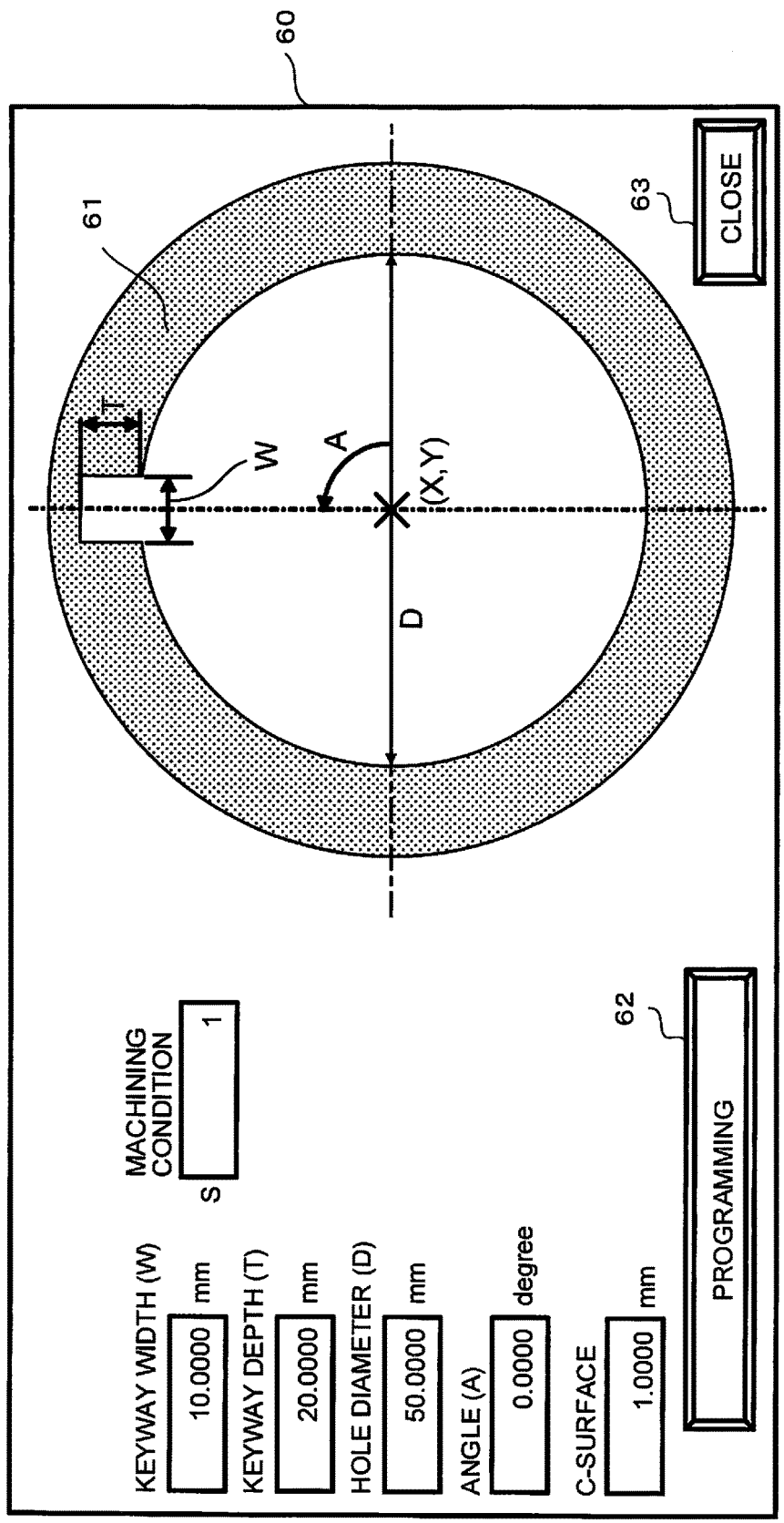
FIG. 8 is a diagram showing an example of a screen for the creation of a program for keyway milling.

FIG. 8 shows an example of a screen 60 for the creation of a program for keyway milling.

The screen 60 for keyway milling program creation comprises a workpiece image 61, an area in which various factors (keyway width (W), keyway depth (T), hole diameter (D), angle (A), C-surface (chamfer), and machining condition S) for machining the keyway 14b are input, a programming button 62 for commanding programming, and a button 63 for closing the screen. If the operator inputs data and depresses the programming button 62, the machining program is created. If the operator depresses the "CLOSE" button 63, the screen is closed and the creation of the program for keyway milling is suspended.

Figure 9:
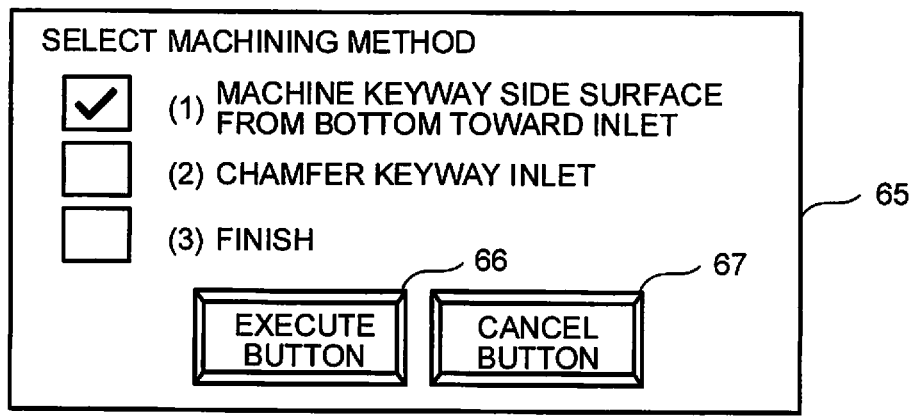
FIG. 9 shows an example of a dialog screen for the selection of the keyway machining method.

FIG. 9 shows an example of a dialog screen 65 for the selection of the keyway machining method.

The dialog screen 65 is provided with an execute button 66, cancel button 67, and check boxes. The check boxes are used to select "(1) MACHINE KEYWAY SIDE SURFACES FROM BOTTOM TOWARD INLET", "(2) CHAMFER KEYWAY INLET", and "(3) FINISH". If item (1) is selected and the execute button 66 is depressed, the machining method 1 shown in FIG. 4 is selected. If item (2) is selected and the execute button 66 is depressed, the machining method 2 shown in FIGS. 5A and 5B is selected. If item (3) is selected and the execute button 66 is depressed, moreover, the machining method 3 shown in FIGS. 6A and 6B is selected.

First, in order to specify the keyway shape, the operator inputs the keyway width W, keyway depth T, hole diameter D, and angle A on the screen 60 for keyway milling program creation of FIG. 8. While the amount of chamfer (C-surface) is initially set to 1 mm, it may be changed to another value. Finally, the number of the machining condition S to be used is input and the programming button 62 is depressed. The machining conditions are previously registered as a set of parameters, including a discharge voltage, machining speed, and the like, depending on the material of the workpiece 14. The operator selects the number of the machining condition S based on the material of the workpiece 14.

The machining program creating device (numerical controller 50 with a memory stored with the software for machining program creation) detects the depression of the programming button 62, obtains the values of the data input on the screen, and creates the machining programs shown in FIGS. 1A and 1B.

Regarding the part (4) in the created machining programs shown in FIGS. 1A and 1B, which commands a path for keyway milling, the machining program creating device may be configured to display the dialog screen 65, thereby urging the operator to select means for keeping the keyway opening from becoming narrow, in order to avoid the problems on the keyway milling (see FIG. 9).

The operator checks an item to be performed on the dialog screen 65 of FIG. 9 and depresses the execute button 66. In order to close the dialog screen 65 and restore the original screen, the cancel button 67 is depressed. If the execute button 66 is depressed, in contrast, the machining program creating device creates a machining program. If item (1) is checked on the dialog screen 65 when this is done, as shown in FIG. 9, the program is created so that the side surfaces of the keyway are machined from the bottom portion of the keyway toward the opening, as shown in FIG. 4.

FIG. 10 shows a program example for a case where only item (1) is checked on the dialog screen 65 of FIG. 9.

If item (1) is not checked on the dialog screen 65 of FIG. 9, a program for roughing is created, as shown in FIG. 6A.

FIG. 11 shows a program example for a case where none of items (1) to (3) is checked on the dialog screen 65 of FIG. 9.

If item (2) of FIG. 9 is checked, a machining program is created such that the keyway opening is chamfered, as shown in FIGS. 5A and 5B. The chamfer portion shown in FIGS. 5A and 5B may be the corner R. The size of the chamfer or corner R, like the keyway width and depth, should only be data-input from the screen.

FIG. 12 shows a program example for a case where only item (2) is checked on the dialog screen 65 of FIG. 9.

FIG. 13 shows a program example for a case where only item (3) is checked on the dialog screen 65 of FIG. 9. If item (3) is checked, a program is created such that finishing is performed, after roughing, along the same path again or along the machining path shifted in the offset direction of the wire electrode under different machining conditions, as shown in FIGS. 6A and 6B.

Two or three of items (1) to (3) may be selected on the dialog screen 65 of FIG. 9.

Figure 14:
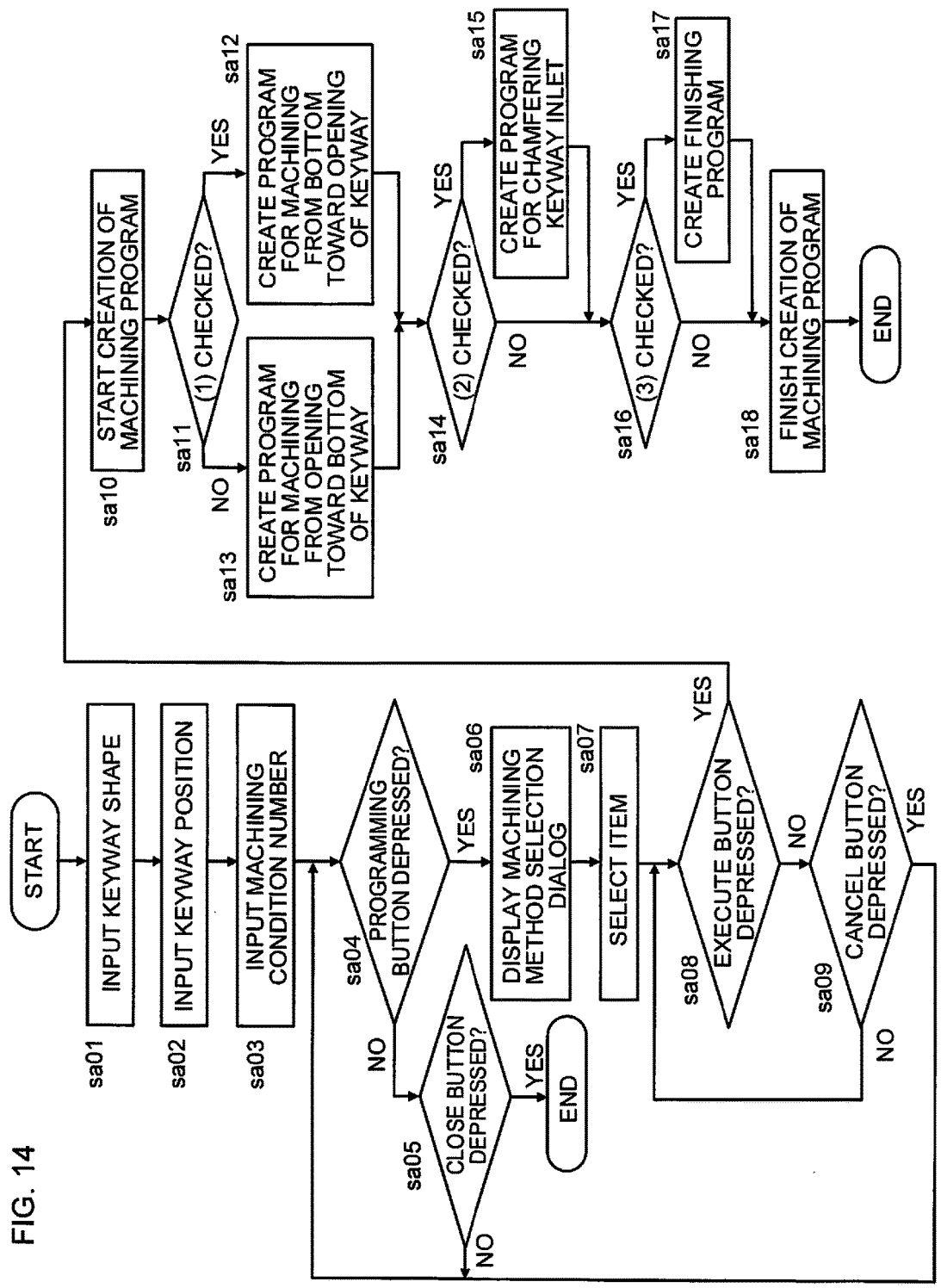
FIG. 14 is a flowchart showing steps of creation of the machining program by the machining program creating device according to the present invention.
Figure 15:
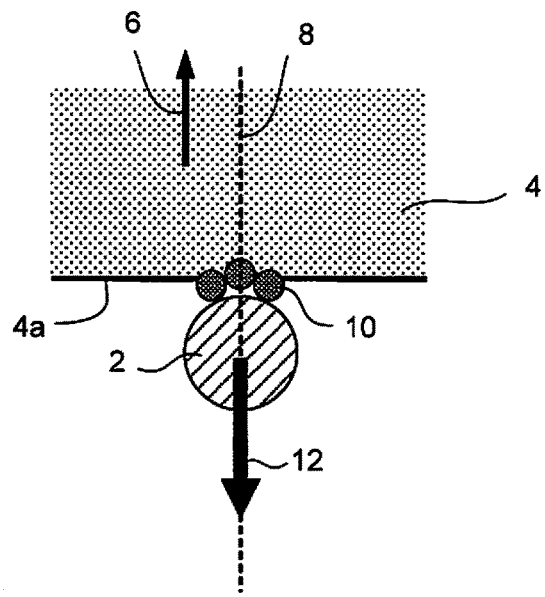
FIG. 15 is a diagram showing how a wire electrode receives a force opposite to a wire advancing direction in a case where a machined surface and a machining path extend perpendicular to each other as a workpiece is cut.
Figure 16:
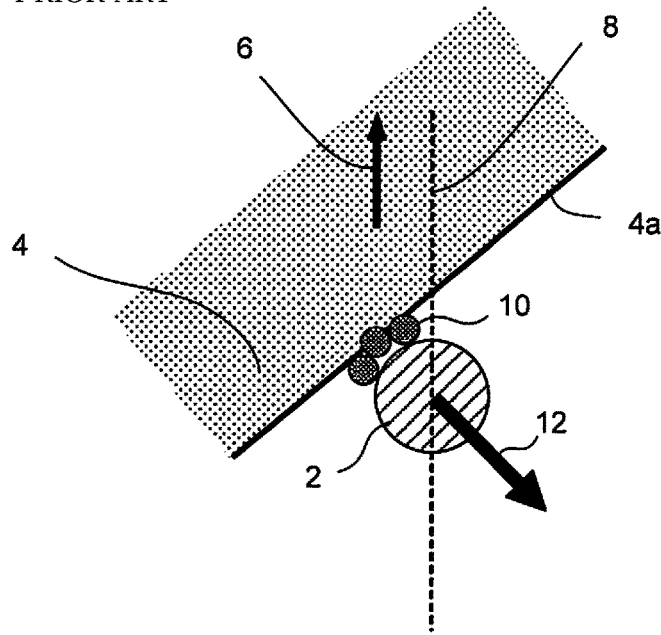
FIG. 16 is a diagram showing how the wire electrode is deviated from the machining path in a case where the machined surface and the machining path do not extend perpendicular to each other as the workpiece is cut.
Figure 17:
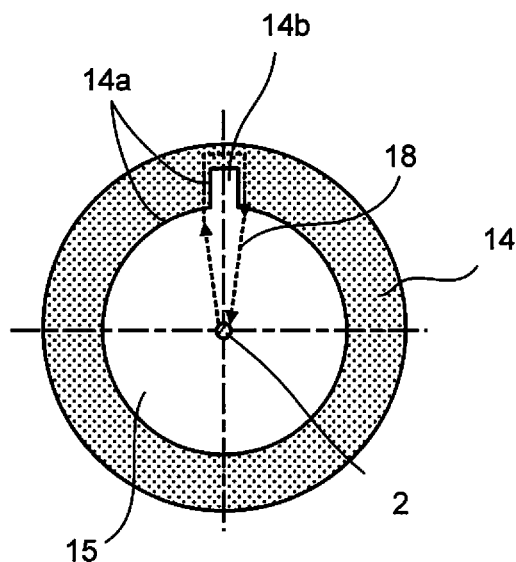
FIG. 17 is a diagram illustrating a conventional method for machining a keyway on the side surface of a round hole in a workpiece.
Figure 18:
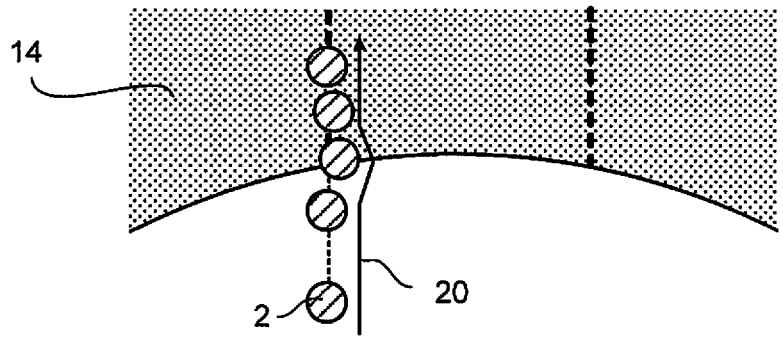
FIG. 18 is a diagram showing how a wire electrode is deviated from a wire machining path in a case where a machined surface and the machining path do not extend perpendicular to each other.
Figure 19:
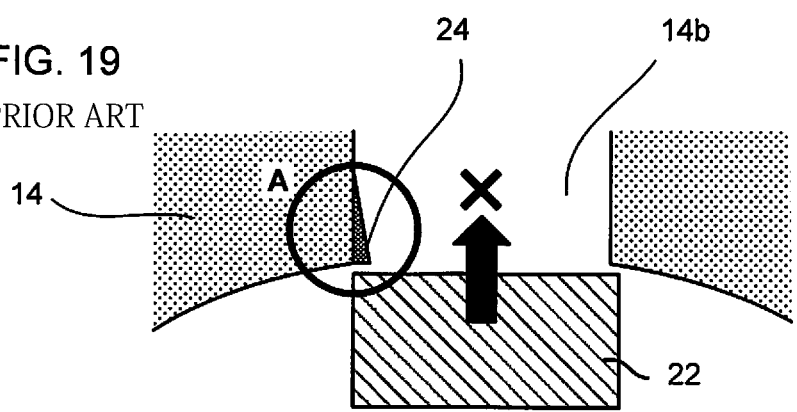
FIG. 19 is a diagram showing how a key cannot be inserted into the machined keyway.

FIG. 14 is a flowchart showing steps of creation of the machining program by the machining program creating device according to the present invention. In the numerical controller 50 for use as the machining program creating device of FIG. 7, the diameter of the round hole in the workpiece is specified by an input to the display through the keyboard. Alternatively, however, the diameter of the round hole may be measured by means of the position measurement function of the wire electric discharge machine so that the resulting measured value can be specified. The following is a sequential description of various steps in this flowchart.

[Step sa01] A keyway shape is input, that is, data on the keyway shape input by the operator is obtained.

[Step sa02] A keyway position is input, that is, data on the keyway position input by the operator is obtained.

[Step sa03] A machining condition number is input, that is, the machining condition number input by the operator is obtained.

[Step sa04] It is determined whether the programming button is depressed or not. If the programming button is determined to be depressed (YES), the processing proceeds to Step sa06. If not (NO), the processing proceeds to Step sa05.

[Step sa05] It is determined whether the "CLOSE" button is depressed or not. If the "CLOSE" button is determined to be depressed (YES), the processing ends. If not (NO), the processing returns to Step sa04 and is continued.

[Step sa06] A machining method selection dialog (dialog screen 65) is displayed.

[Step sa07] An item on the dialog screen 65 is selected, that is, data on the selected item is obtained.

[Step sa08] It is determined whether the execute button 66 is depressed or not. If the execute button 66 is determined to be depressed (YES), the processing proceeds to Step sa10. If not (NO), the processing proceeds to Step sa09.

[Step sa09] It is determined whether the cancel button 67 is depressed or not. If the cancel button 67 is determined to be depressed (YES), the processing proceeds to Step sa04 and is continued. If not (NO), the processing proceeds to Step sa08 and is continued.

[Step sa10] Creation of the machining program is started.

[Step sa11] It is determined whether item (1) is checked or not. If item (1) is determined to be checked, the processing proceeds to Step sa12. If not (NO), the processing proceeds to Step sa13.

[Step sa12] A program is created such that the keyway is machined from its bottom portion toward the opening.

[Step sa13] A program is created such that the keyway is machined from its opening toward the bottom portion.

[Step sa14] It is determined whether item (2) is checked or not. If item (2) is determined to be checked, the processing proceeds to Step sa15. If not (NO), the processing proceeds to Step sa16.

[Step sa15] A program is created such that the keyway inlet is chamfered.

[Step sa16] It is determined whether or not item (3) is checked. If item (3) is determined to be checked, the processing proceeds to Step sa17. If not (NO), the processing proceeds to Step sa18.

[Step sa17] A finishing program is created.

[Step sa18] The creation of the machining program is finished, whereupon this processing ends.

Effect of the Invention

According to the conventional technique disclosed in Japanese Patent Application Laid-Open No. 8-153132 mentioned above, it is possible to create machining programs for electric discharge machining of a keyway, which corresponds to (4) in FIGS. 1A and 1B. However, machining the keyway on the side surface of a round hole requires connection of the wire electrode in the round hole, measurement of the center position of the round hole, positioning in the center position of the round hole, and other operations. It is very time-consuming for an operator unfamiliar with the wire electric discharge machine to carry out these operations. Further, the creation of the machining programs is very laborious, since it requires the operator to master many types of program codes, such as those illustrated in FIGS. 1A and 1B.

According to the present invention, however, the operator can be released from laborious work by creating such machining programs as shown in FIGS. 1A and 1B, so that the productivity in keyway milling is dramatically improved.

In the wire electric discharge machining using machining programs created by the machining program creating device of the present invention, the opening of the machined keyway can be finished to a size specified in a drawing or the Like. Consequently, a problem that a key cannot be inserted into the machined keyway does not occur.

Further, the operator can easily create the machining program for keyway milling without performing any special operations, such as machining program change, in order to prevent the keyway opening from becoming narrow.

The present invention is characterized in that the machining programs are created so as to avoid laborious work such as the connection of the wire electrode within a round hole, measurement of the center position of a round hole, positioning in the center position of a round hole, etc., and the above-described problems specific to the wire electric discharge machine. In the wire electric discharge machining using the machining programs created by the machining program creating device of the present invention, the productivity is improved and the opening of the machined keyway can be machined to a size specified in a drawing or the like. Consequently, the operator can be released from laborious work and a problem that the key cannot be inserted into the machined keyway does not occur. Further, the operator can easily create the machining program for keyway milling without performing any special operations, such as machining program change, in order to prevent the keyway opening from becoming narrow.

The invention claimed is:

1. A machining program creating device for a wire electric discharge machine, configured to create a machining program for machining a keyway on a side surface of a round hole in a workpiece, the machining program creating device comprising:
   a keyway defining section configured to define a shape of the keyway to be machined; and
   a machining program creating section configured to measure a center position and a diameter of the round hole by bringing a wire electrode into contact with the workpiece and create the machining program for machining the keyway, based on the measured center position and diameter of the round hole and the shape of the keyway defined by the keyway defining section.

2. A machining program creating device for a wire electric discharge machine, configured to create a machining program for machining a keyway on a side surface of a round hole in a workpiece, the machining program creating device comprising:
   a keyway defining section configured to define a shape of the keyway to be machined;
   a hole diameter specification section configured to specify a diameter of the round hole; and
   a machining program creating section configured to measure a center position of the round hole by bringing a wire electrode into contact with the workpiece and create the machining program for machining the keyway, based on the measured center position of the round hole, the shape of the keyway defined by the keyway defining section, and the diameter of the round hole specified by the hole diameter specification section.

3. The machining program creating device for a wire electric discharge machine according to claim 2, wherein the machining program creating section is configured to create the machining program for such a machining path that an opening of the keyway is kept from becoming narrow.

4. The machining program creating device for a wire electric discharge machine according to claim 3, wherein the machining program creating section is configured to create the machining program so that the wire electrode advances from a bottom portion of the keyway toward the opening along the machining path for machining side surfaces of the keyway, on either side of the keyway.

5. The machining program creating device for a wire electric discharge machine according to claim 3, wherein the machining program creating section is configured to create the machining program so that a chamfer or a corner R portion is formed at the opening of the keyway.

6. The machining program creating device for a wire electric discharge machine according to claim 3, wherein the machining program creating section is configured to create the machining program so that the wire electrode advances from a bottom portion of the keyway toward the opening along the machining path for machining side surfaces of the keyway and so that a machining path for finishing is formed to repeat the same path as that once machined or a path shifted in an offset direction of the wire.

* * * * *